United States Patent
Tiura

[15] 3,646,738
[45] Mar. 7, 1972

[54] PLANT POSITIONER FOR HARVESTERS

[72] Inventor: George O. Tiura, Modesto, Calif.
[73] Assignee: AgMac Inc., Ripon, Calif.
[22] Filed: Dec. 29, 1969
[21] Appl. No.: 888,735

[52] U.S. Cl. ..........................................................56/314
[51] Int. Cl. ......................................................A01d 63/04
[58] Field of Search ..........................56/119, 229, 314–320, 56/19, 126–130

[56] References Cited

UNITED STATES PATENTS

| | | | |
|---|---|---|---|
| 1,467,415 | 9/1923 | Bailey | 56/229 X |
| 2,466,555 | 4/1949 | Paine et al. | 56/229 X |
| 2,510,728 | 6/1950 | Teichman | 56/314 X |
| 2,614,376 | 10/1952 | Madsen | 56/229 |
| 2,691,859 | 10/1954 | Selby | 56/314 X |
| 2,892,298 | 6/1959 | Chaney | 56/314 |

Primary Examiner—Louis G. Mancene
Assistant Examiner—J. A. Oliff
Attorney—Lothrop and West

[57] ABSTRACT

A harvesting vehicle for bean plants growing in rows in the earth has a plant positioner including, for each row harvested, a four bar linkage mounted at the front of the vehicle and adjustable up and down. One link is a generally horizontal lift plate carrying a leading point running along the ground and a following plant lifter. The linkage permits the point to move rearwardly against a spring and to rise when an obstacle is encountered. Also, a pusher is furnished for pushing aside plants in adjacent rows, for positioning earth near plant stems and for fully lifting partly lifted plants.

7 Claims, 3 Drawing Figures

INVENTOR
GEORGE O. TIURA
BY
Lothrop & West
ATTORNEYS

INVENTOR
GEORGE O. TIURA
BY
Lothrop & West
ATTORNEYS

PLANT POSITIONER FOR HARVESTERS

In the culture of beans, particularly snap beans, it is customary to have the plants arranged in parallel, spaced apart rows in a field and to harvest the beans from the plants by a machine of the sort shown in the U.S. Pat. to Towson No. 3,165,876 and in the U.S. Pat. to Tiura No. 3,479,807. These harvesters include a wheeled vehicle which travels along the rows, usually harvesting two rows at a time by a pair of longitudinally extending reels having picking fingers radially extending therefrom and rotating through the plants to strike the beans therefrom.

A problem arises in that the bean plants are relatively bushy and some of the plant parts tend to grow very close to and sprawl over the ground. This effect sometimes is so pronounced that two adjacent plant rows leave relatively little uncovered ground. There is a further factor which sometimes occurs. The earth in which the plants are grown may be of a lumpy or cloddy nature in the area of the plant stems and may be intermixed with the sprawling lower portions of the plants. Under other conditions the soil can be muddy and mud can get intermixed with the drooping parts of the plants and can rise near the plant stems and adhere to some of the drooping plant parts. All of this interferes with good harvesting.

It is therefore an object of the invention to provide means for lifting the drooping portions of the bean plants as the harvesting machine advances.

It is another object of the invention to prevent the lifting means from being broken or from stalling the machine or causing other difficulty if a solid obstacle should be encountered.

Another object of the invention is to provide a plant positioner which will not only initiate the lifting of parts of a bean from the earth but will continue to lift the plant parts and hold the plant substantially in the desired position at least until the plant is engaged by the harvesting reels.

Another object of the invention is to provide a plant positioner which will readily yield upon encountering an obstacle but which will equally well return to its normal position of operation once the obstacle has been passed.

Another object of the invention is to provide a plant positioner which can be regulated by the operator to have an appropriate elevation in connection with the particular area being harvested.

Another object of the invention is to provide a plant positioner which will not only take care of the plants in the rows being harvested but will likewise push aside any intruding parts of plants in adjacent rows.

A further object of the invention is to provide a plant positioner that can be built into a new harvester or can be applied to an existing harvester as an attachment.

A still further object of the invention is to provide a plant positioner which has means for maintaining the earth in the vicinity of the plant stems at a selected height or position without getting intermixed with the portions of the plant to be harvested.

A further object of the invention is in general to provide an improved plant positioner.

Other objects, together with the foregoing, are attained in the embodiment of the invention described in the accompanying description and illustrated in the accompanying drawings in which.

Figure 1:
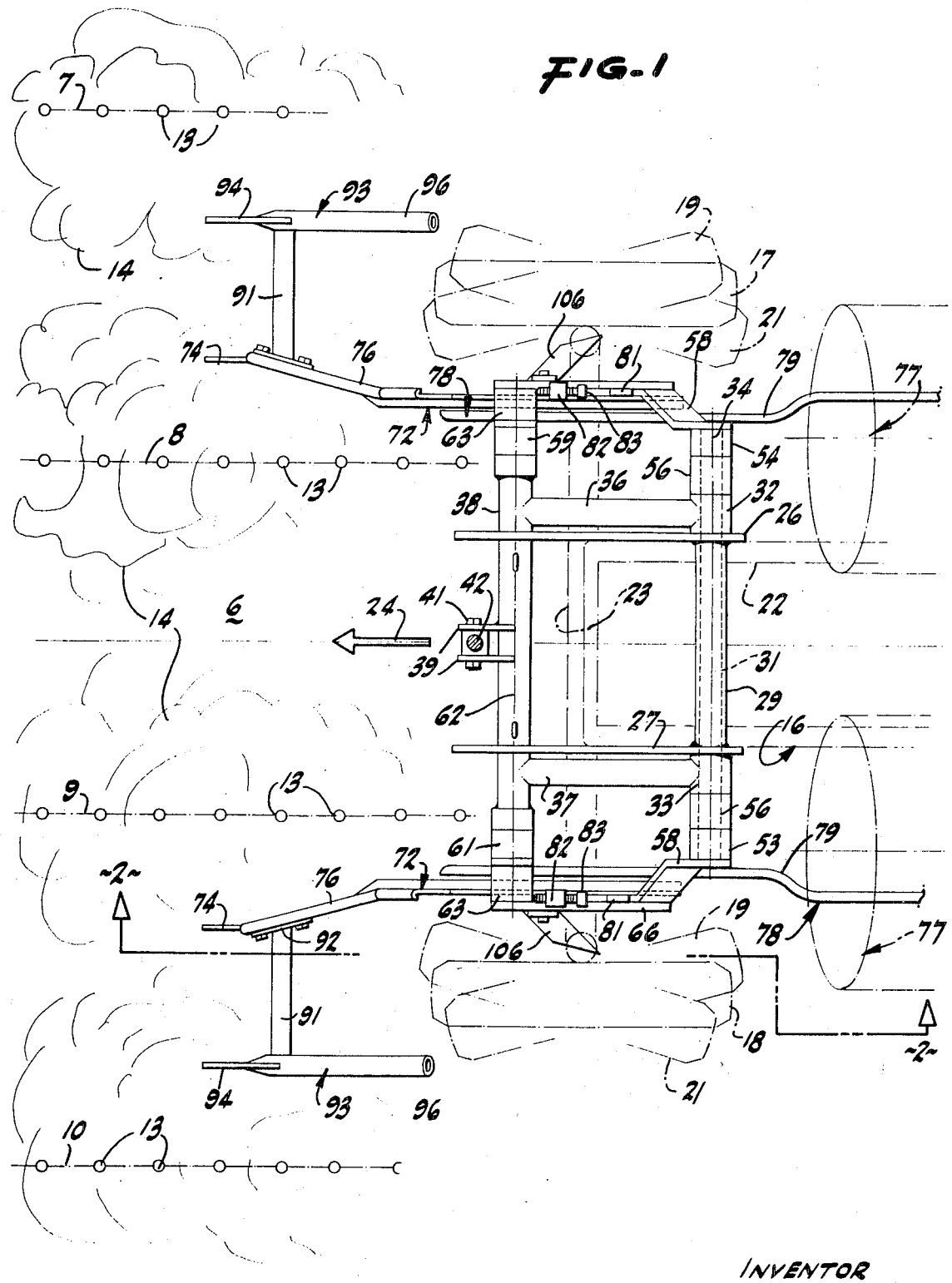
FIG. 1 is a plan of a plant positioner constructed in accordance with the invention and shown with adjacent portions of the bean harvester.

While reference is made herein to the plant positioner as it is particularly adapted for use in connection with the harvesting of beans, especially snap beans, there are also uses of the mechanism in other fields, for example, in connection with the harvesting of peppers, peas and the like, so that reference to a bean harvester is intended to include all appropriate harvesters.

The machine is customarily utilized in a field 6 having a number of rows 7, 8, 9 and 10 planted parallel to each other and consisting of bean plants 12 each having a central stem 13 from which spreads a profusion of growth 14 containing the beans. Sometimes the plants grow so that the growth in the rows virtually merges in a transverse direction. The rows are spaced apart sufficiently to accommodate a harvesting vehicle 16 generally including a pair of front wheels 17 and 18 steerable as indicated by the lines 19 and 21 in FIG. 1. The customary harvesting mechanism also includes a power plant, operating controls and the like, all not shown herein but illustrated in the above-mentioned patents. The harvester main frame 22 is partly carried on a front axle 23 connecting the steering wheels 17 and 18.

The harvester 16 proceeds with its wheel 17 between the rows 7 and 8 and with the wheel 18 between the rows 9 and 10. The major part of the vehicle is between and above the rows 8 and 9 to be harvested. The machine advances in the direction of the arrow 24. Its front end is provided with a pair of positioning units since the two rows 8 and 9 are harvested at the same time. Each plant positioner principally handles but a single row of bean plants. The structure in large part is duplicated on opposite sides of the vehicle.

Typically, the main frame 22 supports a pair of side brackets 26 and 27. These can either be included in the vehicle when it is first manufactured or can, as shown herein, be separate plates that are bolted on to the existing frame. The brackets 26 and 27 include downwardly extending arms 28 serving to support a central tube 29 to which the arms 28 are preferably welded. Extending through the tube is a rotatable cross shaft 31. Just outside of each of the arms 28 the cross-shaft 31 supports first journals 32 and 33 freely rotatable on the shaft 31 about a first transverse axis 34. The first journals 32 and 33 are connected to approximately horizontal bars 36 and 37 in turn joined to a cross tube 38.

In order that the cross tube 38 can be moved up and down at the will of the operator, the cross tube is centrally provided with a pair of ears 39 receiving a pivot pin 41 likewise passing through the end of a piston rod 42. The rod forms part of a hydraulic jack mechanism 43 which also includes a cylinder 44 joined to a suitable controlled source of hydraulic fluid under pressure. The cylinder is mounted by ears 46, connected by a pivot pin 47 to a mounting horn 48 on the frame 22. When the hydraulic content of the cylinder 44 is changed, the jack 43 responds by movement of the piston rod 42 accordingly so that the cross tube 38 is raised or lowered by rotation about the axis 34.

Since sometimes the vehicle is transported when hydraulic pressure is not available, I provide safety chains 51 at one end connected to the cross tube 38 and at the other end having links that can be passed through contoured openings 52 in the leading end of the brackets 26 and 27. In normal use the safety chain is very loose or is disconnected but for transport it can be engaged to hold the cross tube 38 at an appropriate height.

Figure 2:
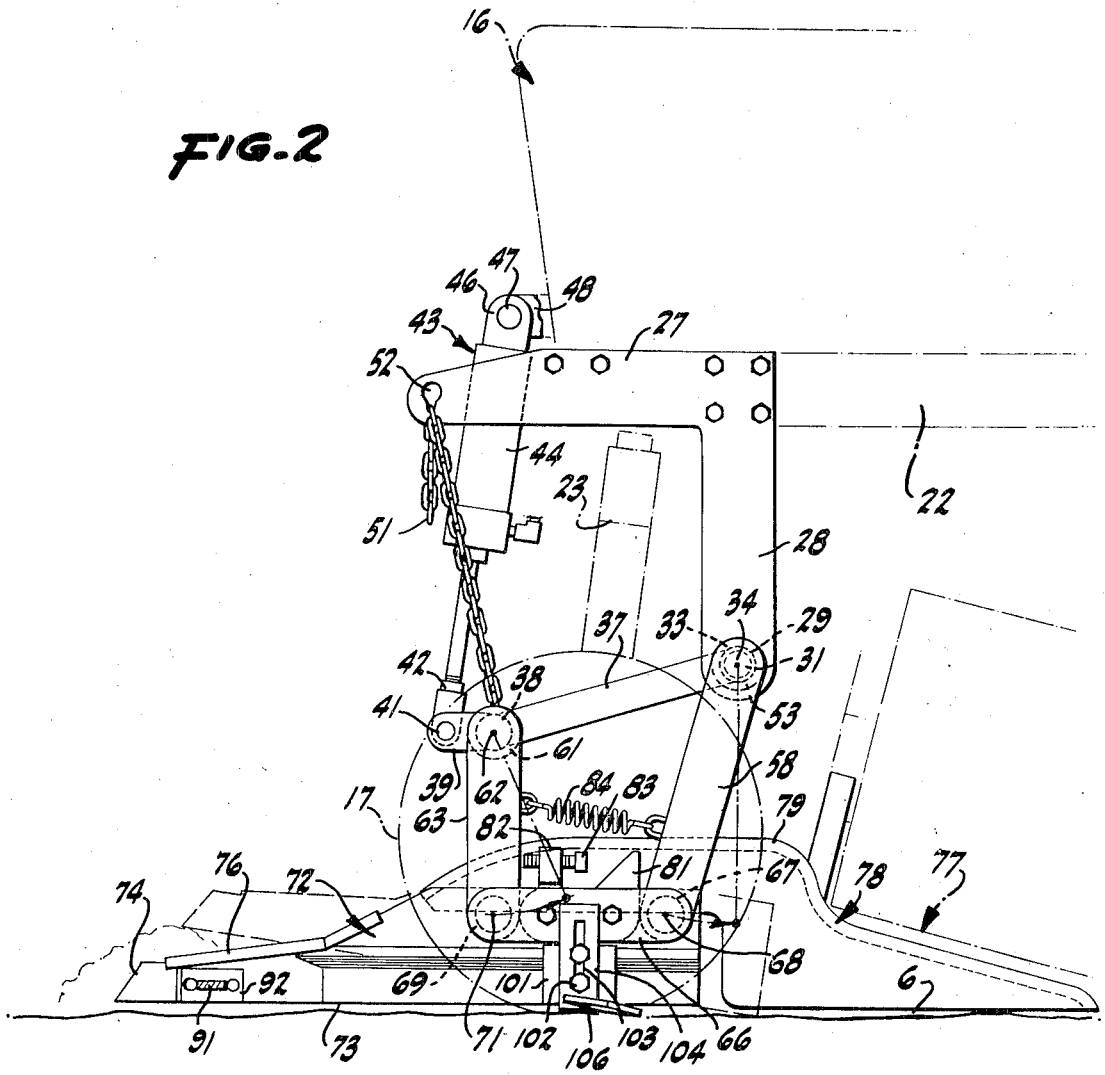
FIG. 2 is for the most part a side elevation of the structure shown in FIG. 1, portions being in section on the line 2—2 of FIG. 1.
Figure 3:
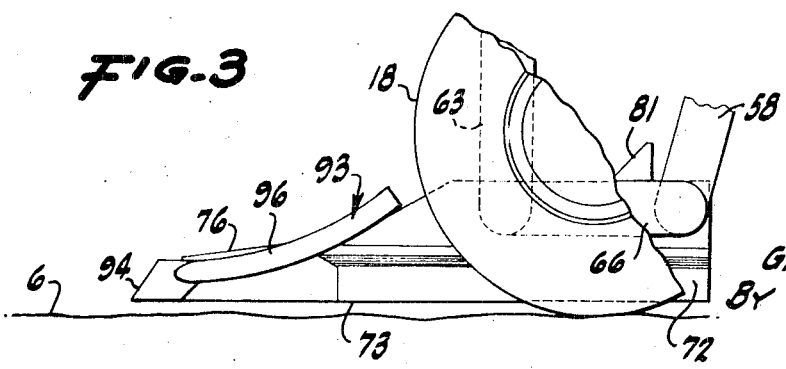
FIG. 3 is a side elevation of the forward part of the structure, parts being broken away.

Fastened on each end of the cross-shaft 31 are bosses 53 and 54 disposed alongside of spacers 56 and adapted to pivot or rotate with the shaft 31 about the first axis 34. Since the mechanisms on opposite sides of the vehicle are substantially the same, the parts described on one side are duplicated with mirror symmetry on the other side. Thus, connected to the boss 53, for example, is a substantially vertical rear link 58 which depends and is offset so that its lower end lies in a predetermined, longitudinal, vertical plane. At opposite ends of the cross tube 38 there are journals 59 and 61 rotatable about a second transverse axis 62 parallel to the axis 34. A substantially vertical front link 63 depends from the journal 61, for example, and thus can swing about the axis 62 just as the rear link 58 can swing about the axis 34. These links are of different lengths, as shown in FIG. 2, and the journal 53 is normally considerably higher than the journal 61.

Both the rear link 58 and the front link 63 at their lower ends are coplanar and are connected to a lift block 66 extending in a fore and aft direction. The rear link 58 is connected to the lift block by a pivot 67 effective to permit relative rotation about a third transverse axis 68 while the front link 63 is connected to the lift block by a pivot 69 allowing swinging movement about a fourth transverse axis 71. The bar 37, the front link 63, the rear link 58 and the lift block 66 constitute a four bar linkage freely movable within a relatively wide range, unless constrained.

Supported on the lift block is an elongated runner 72 having a relatively straight base 73 effective to operate on or close to the ground. The runner 72 terminates forwardly in a leading point 74 that is relatively narrow and is rather sharp. The point support may be laterally offset. The point can run on or even under the surface of the earth. Upon encountering a plant branch, the point will probe under and lift the plant upwardly as the runner advances. The runner between the point and the front link 63 is preferably provided with an outwardly curved edge 76 that rises as it extends rearwardly.

Once a plant has been lifted from the ground or engaged under by the point 74, the forward movement of the edge 76 continues to lift the otherwise drooping part of the plant toward an erect posture.

Adjustably supported on the forward frame end of the customary reel 77 is a longitudinal lifting shield 78. This is a plate having an edge roll 79. A rear portion extends at least part way under the reel and a forward portion lies alongside of and, in practice, in virtual lateral contact with the runner 72, although shown spaced for clarity of illustration. The shield 78 may be inside or outside the runner and in either case avoids entanglements and provides for a smooth, virtually continuous support for the lifted plants all the way into the picking position.

Means are provided for limiting the relative motion of the links of the four bar linkage. For that reason there is upstanding from the lift block 66 an abutment 81 spaced from the edge of the rear link 58 under normal operation but in contact with that link to limit extreme rearward motion of the block 66. Similarly, upstanding from the lift block 66 is a lug 82 carrying an adjustment screw 83 which can be positioned to contact the edge of the forward link 63 in one extreme forward position of the block 66.

In order to urge the four bar mechanism in one direction, that is, as far forwardly as possible, there is interposed between the rear link 58 and the front link 63 a tension spring 84, omitted from FIG. 1 for clarity. In the absence of some superior force, the spring 84 holds the parts so that the adjusting screw 83 abuts the edge of the front link 63. This position is the normal one in which the lift block 66 and the attached runner 72 are substantially in a horizontal position, as shown by the full lines in FIG. 2.

In the use of this structure, the operator upon entering the harvesting operation adjusts the hydraulic jack 43 so as to position the cross tube 38 at the desired height. During the harvesting operation the operator may occasionally readjust the hydraulic jack 43.

The adjusting screw 82 having been properly set, the machine advances with the point 74 for each plant row running along the inside of the plant stems 13 and underrunning the overhanging or sprawling portions of the plant. As the runner advances, the plant parts ride up over the surface 76 and continue to rise on the surface 79 and are held in a generally erect position. The subsequently encountered harvesting tines on the revolving reels 77 can appropriately harvest the beans.

As the device advances one of the points 74 may on occasion encounter an obstruction, such as a rock. In severe cases the encounter would normally be sufficient either to break some of the mechanism or to stop the forward operation of the machine. In the present instance, however, a momentary arrest of a point 74 simply causes the four bar linkages to operate. The lift blocks 66 move generally rearwardly and tip upwardly at the forward end since the front link 63 is normally positioned with the fourth axis 71 substantially below the second axis 62. Under these circumstances a rearward thrust on a point 74 simply moves the runner 72 rearwardly against spring tension and in doing so lifts the point 74 up and over any particular obstruction. This lifted position is shown by the dotted lines in FIG. 2. The rearward, lifting movement of the lift blocks accompanied by similar movement of the other links extends the springs 84 so that as soon as the obstruction is cleared the springs relax and restore the parts to their original position with the runners again positioned along or on the ground and with the points 74 slightly below the surface of the ground.

As an adjunct to this lifting arrangement, I preferably provide on each of the runners 72 just behind the point 74 an outrigger bar 91 extending from a removable attaching pad 92. On the outrigger bar is a lift 93, having a point 94 merging with a rearwardly and upwardly extending guide 96. The spacing between the points 74 and 94 is preferably such that the point 94 underlies and travels beneath the overhanging foliage of the bean plants in the adjacent row 10 or in the adjacent row 7.

The outriggers help the runners 72 to clear paths free of vines for the advancing wheels 17 and 18 of the harvester. Crushing of and bearing down on the plants are avoided and the plants in the adjacent rows 7 and 10 are left in good condition for bean removal on the next pass.

Soil and harvesting conditions vary considerably and it is sometimes the case that lumps or clods are adjacent the plant stems and tend to be picked up by the tines of the reels 77 and thrown into the harvester along with the beans. This is undesirable and means are provided for crushing or diverting wet lumps or dry clods from the pickup reels. About centrally of the outside of each runner 72 a pad 101 is secured. Bolts 102 project from the pad into an adjusting slot 103 in an upstanding arm 104 on a soil positioner blade 106. This tilted blade has its leading edge somewhat elevated and is disposed at a rearward rake. Conveniently, the blade is located just below the turning pivot of the adjacent wheel and extends close thereto in all wheel steering positions.

The blade 106 is adjusted vertically to run on or close to the surface of the ground. As the machine advances any clods not crushed by the wheel but in the reel path are either smoothed down by the blade and forced into the soil out of the way or are deflected outwardly away from the reel path. Since the runner 72 operates about at the ground surface and is adjusted vertically to continue to do so, the same adjustment by the jack 43 also keep the blade 106 in proper position.

I claim:

1. A plant positioner for a bean harvester comprising a carriage movable in an intended direction of travel along rows of bean plants growing in the earth and having a frame with a leading end, a horizontally extending central tube on said leading end concentric with a first transverse axis, said central tube extending transverse to said intended direction of travel a cross-shaft rotatable in said tube about said first axis, a boss fast on said cross-shaft, a first journal rotatable on said cross-shaft about said first axis, a substantially horizontally extending bar at one end joined to said first journal, a cross tube joined to the other end of said bar and concentric with a second transverse axis parallel to said first axis, a second journal rotatable on said cross tube about said second axis, a substantially horizontally extending lift block having a leading end and a trailing end, a substantially vertically extending rear link, means connecting the upper end of said rear link to said boss for pivotal movement about said first axis, a first pivot connecting the lower end of said rear link to said lift block adjacent the trailing end thereof for pivotal movement about a third transverse axis parallel to said first axis, a substantially vertically extending front link, means connecting the upper end of said front link to said second journal for pivotal movement about said second axis, a second pivot connecting the lower end of said front link to said lift block adjacent the leading end thereof for pivotal movement about a fourth transverse axis parallel to said first axis, said first pivot and said second pivot being closer together in said intended direction of travel than said first journal and said second journal, and deflecting means at the leading end of said lift block for running under and lifting said bean plants.

2. A device as in claim 1 in which said fourth transverse axis is substantially beneath said second transverse axis and said third transverse axis is below and ahead of said first transverse axis when said lift block is substantially horizontal.

3. A device as in claim 1 in which said bar and said rear link are both of approximately the same predetermined length between pivot axes and said lift block and said front link are both approximately of a length greater than said predetermined length between pivot axes.

4. A device as in claim 1 including a soil positioner blade extending transversely and connected to said lift block with the leading edge of said blade higher than the trailing edge thereof and at an elevation whereby said blade is adapted to engage the earth adjacent the stems of said plants.

5. A device as in claim 1 including an outrigger extending transversely from said deflecting means, and a lift on said outrigger and transversely aligned with and parallel to said lift block in position to push aside bean plants in a row adjacent to the row of bean plants engaged by the deflecting means.

6. A device as in claim 1 in which when said third and fourth axes are approximately in the same horizontal plane said second axis is substantially vertically above said fourth axis a predetermined distance above said plane and said first axis is to the rear of said third axis and more than said predetermined distance above said plane.

7. A device as in claim 1 in which said deflecting means includes an apron disposed behind a point and having an upper surface rising toward the rear and includes a stationary upright shield on said frame, said shield having an upper margin substantially in longitudinal alignment with and continuing said upper surface of said apron.

* * * * *